(12) United States Patent
Matsumura et al.

(10) Patent No.: US 9,873,392 B2
(45) Date of Patent: Jan. 23, 2018

(54) TERMINAL CONNECTION ASSEMBLY FOR VEHICLE POWER DISTRIBUTION DEVICE

(71) Applicant: SUMITOMO ELECTRIC WIRING SYSTEMS, INC., Bowling Green, KY (US)

(72) Inventors: Akihiro Max Matsumura, Farmington Hills, MI (US); Charles Paul Depp, Ann Arbor, MI (US)

(73) Assignee: Sumitomo Wiring Systems, Ltd., Yokkaichi, Mei (JP)

( * ) Notice: Subject to any disclaimer, the term of this patent is extended or adjusted under 35 U.S.C. 154(b) by 240 days.

(21) Appl. No.: 14/827,654

(22) Filed: Aug. 17, 2015

(65) Prior Publication Data

US 2017/0050591 A1 Feb. 23, 2017

(51) Int. Cl.
*B60R 16/023* (2006.01)
*H02G 15/02* (2006.01)
*H02J 4/00* (2006.01)
*H02G 3/16* (2006.01)

(52) U.S. Cl.
CPC .......... *B60R 16/0238* (2013.01); *H02G 3/16* (2013.01); *H02J 4/00* (2013.01)

(58) Field of Classification Search
None
See application file for complete search history.

(56) References Cited

U.S. PATENT DOCUMENTS

| 5,558,544 | A | * | 9/1996 | Okada | H01R 11/282 439/762 |
|---|---|---|---|---|---|
| 8,608,506 | B2 | | 12/2013 | Zhao | |
| 8,851,939 | B2 | | 10/2014 | Bazenas | |
| 2001/0023037 | A1 | * | 9/2001 | Kieninger | H01R 11/282 429/100 |
| 2014/0160697 | A1 | * | 6/2014 | Stern | B60R 16/0238 361/752 |
| 2014/0339892 | A1 | * | 11/2014 | Gendlin | B60L 3/04 307/10.1 |

FOREIGN PATENT DOCUMENTS

EP 1439610 7/2004

* cited by examiner

*Primary Examiner* — Jared Fureman
*Assistant Examiner* — Aqeel Bukhari
(74) *Attorney, Agent, or Firm* — Reising Ethington P.C.

(57) ABSTRACT

A terminal connection assembly that provides battery power (also referred to as B+ power) to one more bus bar(s) in a power distribution device that is part of a vehicle electrical system, such as a power distribution box (PDB). The terminal connection assembly may include a post, a cylinder, annular contacts, and a retention feature and the terminal connection assembly is designed to improve the ease with which the power distribution device is assembled and/or serviced.

16 Claims, 3 Drawing Sheets

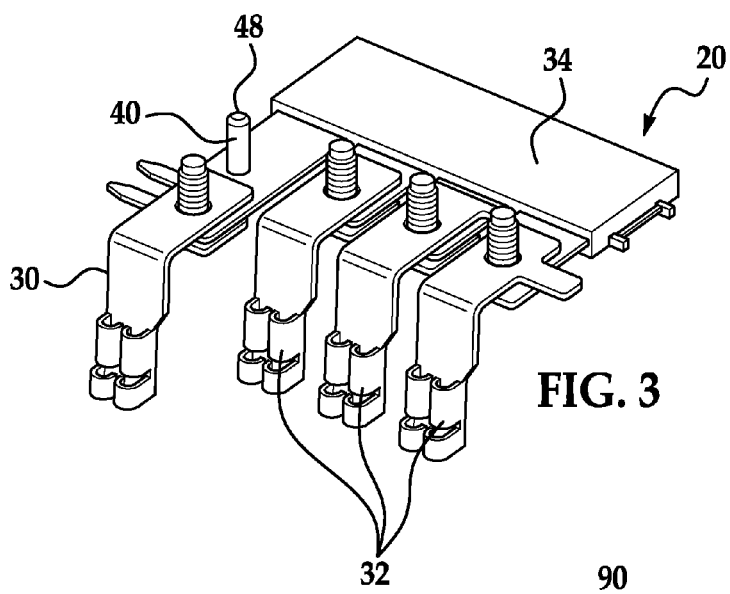
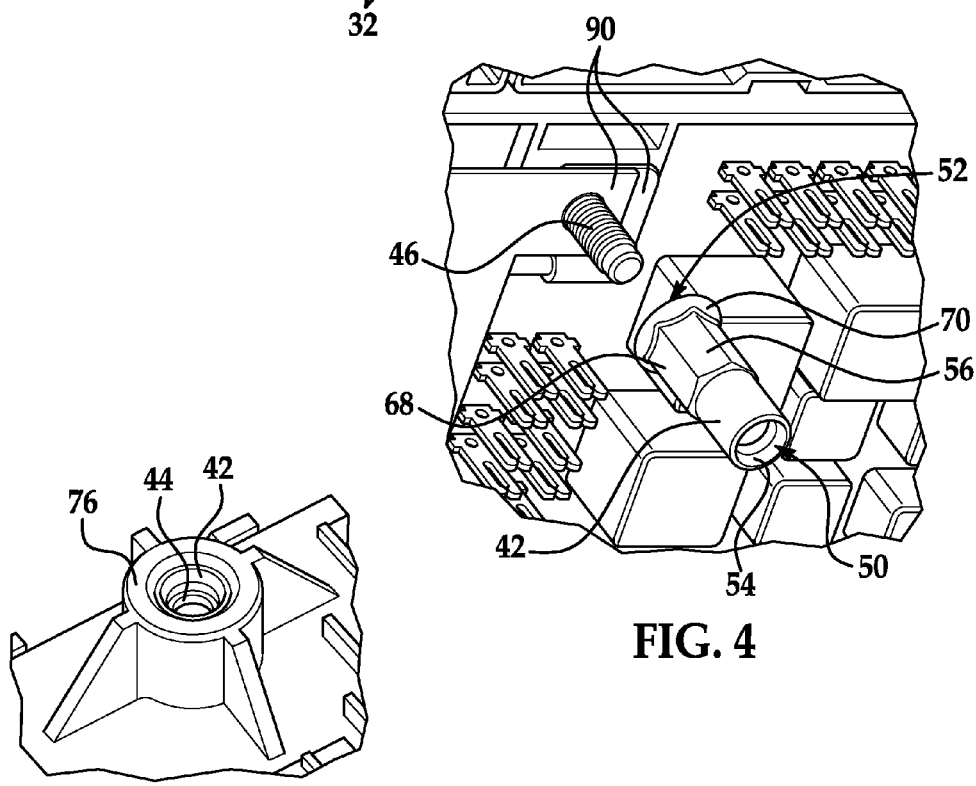

US 9,873,392 B2

TERMINAL CONNECTION ASSEMBLY FOR VEHICLE POWER DISTRIBUTION DEVICE

FIELD

The present invention relates generally to a power distribution device for a vehicle electrical system and, more specifically, to a terminal connection assembly within the power distribution device.

BACKGROUND

There are various types of power distribution devices used in vehicle electrical systems, some of these devices are referred to as power distribution boxes, electrical connection boxes, power centers, etc. A power distribution device distributes low voltage battery power to various accessories and devices within a vehicle electrical system. In many traditional power distribution device designs, positive battery power was provided via a battery cable or terminal that was directly bolted down to bus bars within the device.

One potential drawback of this type of traditional design relates to the ease with which the battery terminal can be connected or disconnected, as it is sometimes difficult for an operator to get the necessary tools in place (e.g., socket, wrench, etc.) when bolting or unbolting the battery terminal directly to the bus bar. The same challenge may arise during servicing, as it is oftentimes necessary to disconnect the battery before servicing the power distribution device. Skilled artisans will appreciate that by providing a power distribution device with an improved terminal connection design, the assembly and/or servicing process can be simplified and thereby improved.

SUMMARY

According to one aspect, there is provided a terminal connection assembly for use in a power distribution device that is part of a vehicle electrical system. The terminal connection assembly may comprise: a post; a cylinder having a lower end, an upper end, an interior surface, and an exterior surface, where the cylinder lower end receives the post; and at least one annular contact being retained within the cylinder lower end, where the annular contact makes an electrical connection between the post and the cylinder. The terminal connection assembly provides battery power to one or more bus bar(s) in the power distribution device.

According to another aspect, there is provided a terminal connection assembly for use in a power distribution device that is part of a vehicle electrical system. The terminal connection assembly may comprise: a cylinder having a lower end, an upper end, an interior surface, and an exterior surface, where the cylinder upper end includes threads on the interior surface and a non-rotational feature on the exterior surface; at least one annular contact being retained within the cylinder lower end, where the annular contact is designed to make an electrical connection with a component that provides battery power; and a retention feature interacting with the threads on the cylinder interior surface and securing the terminal connection assembly within the power distribution device. The terminal connection assembly provides battery power to one or more bus bar(s) in the power distribution device.

DRAWINGS

Preferred exemplary embodiments of the invention will hereinafter be described in conjunction with the appended drawings, wherein like designations denote like elements, and wherein:

FIG. 3 is a perspective view of a portion of the terminal connection assembly of FIG. 2 and illustrates a post that is part of the assembly;

FIG. 4 is also a perspective view of a portion of the terminal connection assembly of FIG. 2 and illustrates a cylinder and retention feature that are part of the assembly;

FIG. 5 is another perspective view of a portion of the terminal connection assembly of FIG. 2 (the orientation of the assembly is different than that of FIGS. 2-4) and illustrates a non-rotational feature that is part of the assembly;

DESCRIPTION

Figures 1, 2:
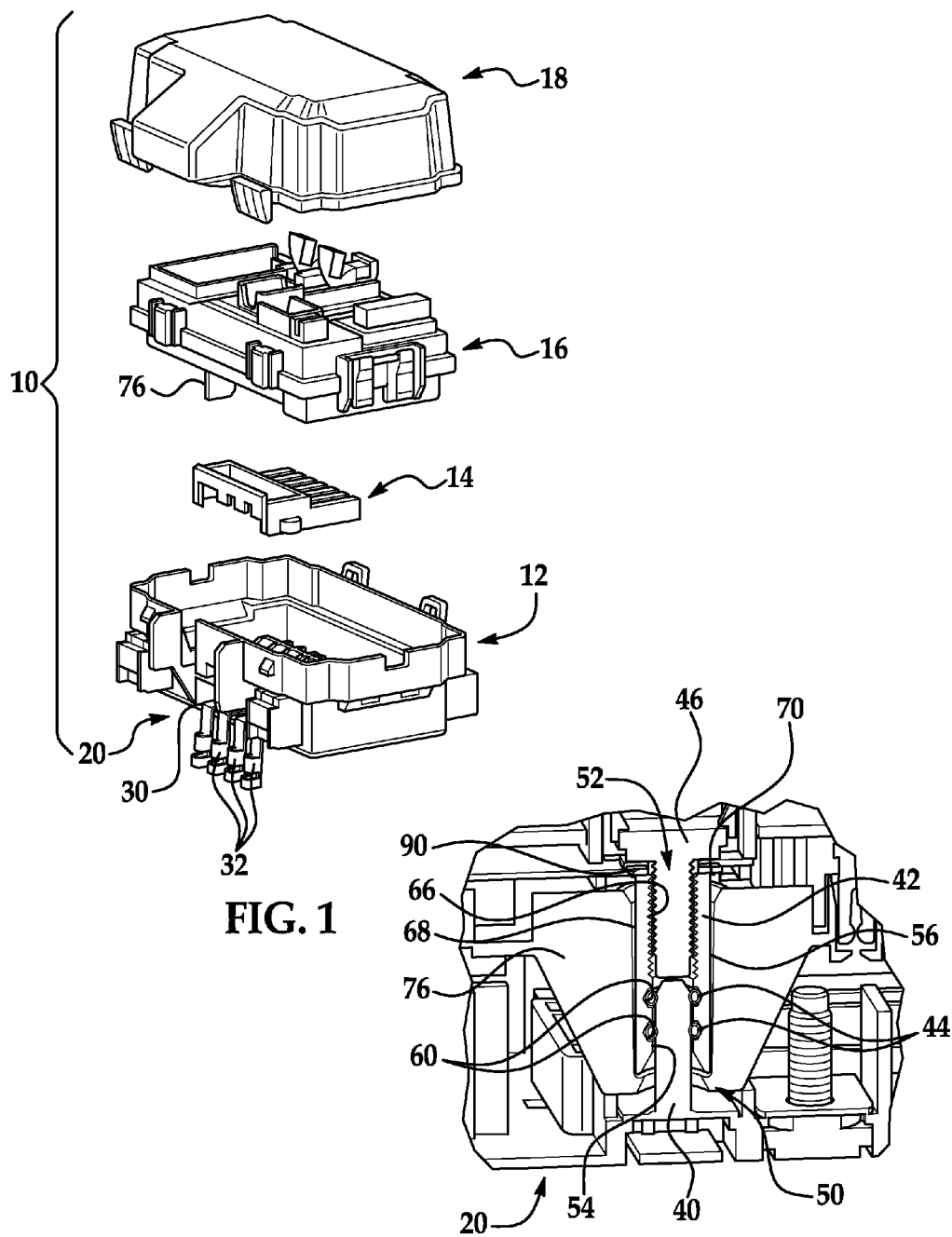
FIG. 1 is an exploded perspective view of an exemplary power distribution device.
FIG. 2 is a cross sectional perspective view of an exemplary terminal connection assembly that may be used with the power distribution device of FIG. 1.

There is described herein a terminal connection assembly that provides battery power (also referred to as B+ power) to one more bus bars in a power distribution device for a vehicle electrical system, such as a power distribution box (PDB). With reference to FIG. 1, there is shown a power distribution device 10 that routes or distributes power throughout a vehicle electrical system and generally includes a lower cover 12, a master fuse cover 14, a junction block assembly 16, an upper cover 18, and a terminal connection assembly 20. Battery power is provided from a vehicle battery and/or alternator (not shown) to the terminal connection assembly 20 via a battery terminal or cable 30, and from there battery power is distributed to high current devices 32 via a master fuse 34 and to the junction block assembly 16 via the terminal connection assembly 20. The following description is directed to different embodiments and features of the terminal connection assembly 20 and its role within the power distribution device 10. Those skilled in the art will appreciate that terminal connection assembly 20 may be used with any number of different types of power distribution devices and is not limited to the exemplary PDB assembly 10 shown here, which is simply provided for purposes of illustration.

Turning now to FIGS. 2-8, there are shown different views of the terminal connection assembly 20 and components thereof. According to the illustrated embodiment, the terminal connection assembly 20 includes a post 40, a cylinder 42, annular contacts 44, and a retention feature 46. It should be appreciated that the embodiments shown and described herein are merely exemplary and that other embodiments could certainly be used instead.

Post 40 is best shown in FIGS. 2 and 3 and is a cylindrical metal stud or post that is secured to the master fuse 34 (e.g., welded, swaged, riveted, press-fitted, bolted, Tog-O-Loc, etc.) and extends upwards and away from the master fuse at a distal end 48 for insertion into a lower end of the cylinder 42. The cylindrical metal post 40 may be tapered at the distal end 48 to facilitate easy insertion into the lower end of the cylinder 42, although this is not necessary.

Cylinder 42 is shown in FIGS. 2 and 4-6 and includes a lower end 50, an upper end 52, an interior surface 54 and an exterior surface 56 and is designed to connect with both the post 40 and the retention feature 46. According to the cylinder example illustrated in the drawings, the lower end 50 receives the post 40 via one or more annular contacts 44 while the upper end 52 threadingly receives the retention feature 46, which is shown in the form of a bolt. As best illustrated in FIG. 2, the post 40 projects into a non-threaded lower end 50 of the cylinder 42 such that it is circumferentially surrounded and contacted by annular contacts 44, which are secured within annular grooves or channels 60 formed on the interior surface 54 of the cylinder. In the illustrated embodiment, the annular contacts 44 are in the form of circular springs (see FIG. 7), however, other types of contacts could be used instead, as explained below in more detail. According to a different embodiment, the annular contacts 44 are mounted or installed in annular channels formed on an exterior surface of the post 40, as opposed to being secured within channels located on the interior surface 54 of the cylinder 42. It may be desirable to provide two pairs of annular channels/contacts that are axially spaced from one another so that each contact 44 can circumferentially surround and contact the post 40 at a different axial position; this arrangement can provide a solid and balanced physical contact and hence a more predictable electrical connection between the post 40 and the contacts 44. Of course, other arrangements with more or less annular contacts 44 may be used instead.

Figure 6:
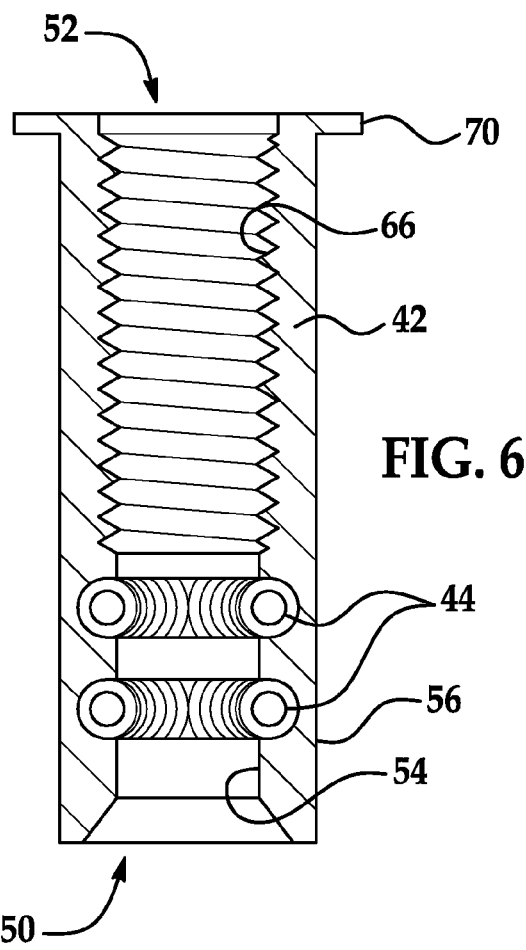
FIG. 6 is a cross sectional view of a portion of the terminal connection assembly of FIG. 2 and illustrates a cylinder and annular contact that are part of the assembly.

Upper end 52 of the cylinder includes threads 66 formed on an interior surface and a non-rotational feature 68 and a flange 70 formed on an exterior surface. The interior threads 66 are female threads and cooperate with corresponding male threads on the exterior surface of the retention feature 46, as is commonly understood. The non-rotational feature 68, which is best shown in FIG. 4 and is normally hidden because it is encased within the molded part of the junction block assembly 16 that is seen in FIG. 5, is designed to prevent the cylinder 42 from spinning or rotating when a retention feature 46 like a bolt is being tightened or untightened. By maintaining the cylinder 42 in a stationary or non-rotational position, an operator can easily get access to and torque down the bolt 46 from a top side during an assembly process or servicing operation. One potential way for implementing the non-rotational feature 68 is by providing the hex-type configuration shown on the exterior surface of the cylinder 42 in FIG. 4 so that the cylinder cannot easily spin within a molded part. FIG. 5, which is upside down with respect to FIGS. 2, 4 and 6, shows the cylinder 42 being encased or surrounded by a molded boss or other feature 76 that is part of a lower housing unit of the junction block assembly 16. The boss 76 may be an integrally molded part of the lower housing unit of the junction block assembly 16 that is molded over the cylinder 42 during manufacturing. Other types of non-rotational features may be used so that the cylinder 42 does not rotate or spin within the lower housing unit. The upper end 52 may also include a flange 70 at the opening of the cylinder 42 that facilitates proper installation and seating of the cylinder within the junction block assembly lower housing unit.

Annular contacts 44 are at least partially illustrated in FIGS. 2 and 4-7 and are designed to physically and electrically connect the post 40 to the cylinder 42. The annular contacts 44 may be provided according to any number of different embodiments, including the spring-like embodiment shown in FIG. 7 and the sleeve-like embodiment shown in FIG. 8. In both embodiments, the annular contacts 44 are either circular or cylindrical so that they circumferentially surround and make contact with the post 40. The annular contacts 44 are preferably made of a conductive metal, such as copper or a copper-based alloy, that is also somewhat resilient and/or ductile; it should be appreciated that copper is not the only metal that may be used, as any suitably conductive material may be employed instead. In both of the illustrated embodiments, the annular contacts 44 are resilient in nature and are dimensionally sized such that they become somewhat compressed or deformed when the post 40 is inserted into the cylinder lower end 50. Skilled artisans will appreciate that this type of resilient circumferential contact can improve the electrical connection between the components involved in terms of improving connection reliability, providing for increased dimensional tolerances, reducing electromagnetic interference (EMI), etc. Both the spring- and sleeve-like annular contact embodiments can contact the post at a number of discrete locations, thus, establishing a number of individual contact points.

Figure 7:
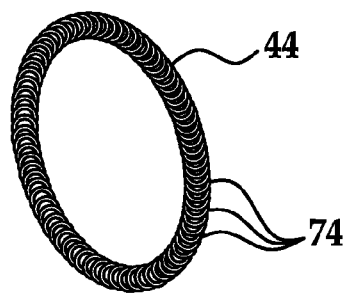
FIGS. 7 and 8 are different views of exemplary annular contacts that may be used with the terminal connection assembly of FIG. 2.
Figure 8:
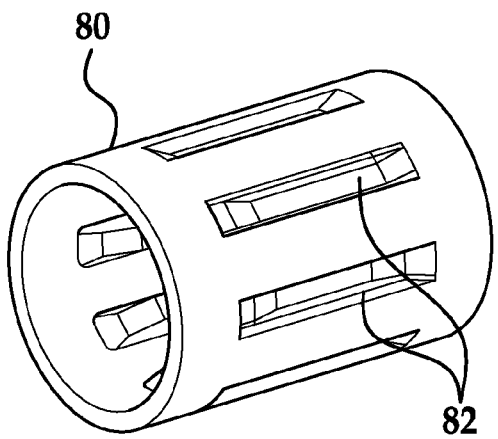

Turning now to FIG. 7, there is shown an example of a spring-like annular contact 44 that is in the form of a coiled spring where every coil that contacts the post 40 or the cylinder 42 may act as an individual or separate contact point. The spring-like annular contact 44 includes a number of individual coils 74 that each creates an individual electrical contact point, but together function as a single efficient contact for conveying suitable amounts of current between the post 40 and the cylinder 42. Likewise, the sleeve-like annular contact 80 in FIG. 8 has a number of axial slits that create inwardly extending features 82, where each of these features is designed to resiliently contact the exterior surface of the post 40. The size, shape and other characteristics of the spring- and sleeve-like annular contacts 44 can be selected so that the interior of the contact is tight enough to present a reasonable amount of retention force when the post 40 is inserted into the cylinder 42, but it should not be so tight as to prevent the insertion of the post or to present an unreasonable amount of resistance to such insertion. Sleeve-like annular contacts 80 may or may not be inserted into grooves, channels or other recesses formed on the interior surface of the cylinder or the exterior surface of the post, as described above. It should be appreciated that alternative annular contacts, other than spring- and sleeve-like annular contacts, could certainly be used instead and that the terminal contact assembly is not limited to these particular examples.

Retention feature 46 is show in FIGS. 2 and 4 and is designed to firmly secure the terminal connection assembly 20 to one or more components of the junction block assembly 16, such as bus bars 90. Battery power is provided from a vehicle battery and/or alternator to the junction block assembly 16 via the terminal connection assembly 20, and that the retention feature 46 helps secure these assemblies together. According to the example shown in the drawings, the retention feature 46 is in the form of a bolt that threads into the cylinder upper end 52 in a manner that compresses one or more bus bars 90 therebetween and, in this way, makes an electrical connection between the terminal connection assembly 20 and the junction block assembly 16 via the bus bars. The bolt 46, which can be a M6 or other suitable bolt, is torqued down so that a secure connection is made with threads 66 on the interior surface 54 of the cylinder. The actual electrical connection could take place between the cylinder upper end 52 and the underside of the bus bars 90, between the underside of the head of bolt 46 and the upperside of the bus bars, between some other interface of surfaces, or a combination thereof. The exact electrical path between retention feature 46 and the bus bars 90 is not imperative, so long as the terminal connection assembly 20 is securely attached and electrically connected to the junction block assembly 16 or some other suitable component of the power distribution device 10. Welds, swages, rivets, press-fit connections, Tog-O-Locs, etc. are all non-limiting examples of other forms of retention features 46 that could be used.

In operation, B+ power is provided from a battery and/or alternator to the junction block assembly 16 via the following path: from the battery terminal 30 to the post 40, from the post to the cylinder 42 via the annular contacts 44, from the cylinder to the bus bars 60 via the compression by the retention feature 46, and from the bus bars to the remainder of the junction block assembly.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A terminal connection assembly for use in a power distribution device that is part of a vehicle electrical system, comprising:
    a post being made from an electrically conductive metal and having an exterior surface;
    a cylinder being made from an electrically conductive metal and having a lower end, an upper end, an interior surface, and an exterior surface, the cylinder lower end receives the post; and
    at least one annular contact being made from an electrically conductive metal and being retained within the cylinder lower end, the annular contact is dimensionally sized such that, when the post is inserted within the cylinder lower end, the annular contact becomes slightly compressed or deformed between the post exterior surface and the cylinder interior surface and the annular contact makes an electrical connection between the post and the cylinder, wherein the terminal connection assembly provides battery power to one or more bus bar(s) in the power distribution device.

2. The terminal connection assembly of claim 1, wherein the post is a cylindrical metal post that is secured to a master fuse and extends away from the master fuse towards the cylinder lower end.

3. The terminal connection assembly of claim 2, wherein the cylindrical metal post includes a distal end that is tapered to facilitate easy insertion of the post into the cylinder lower end.

4. The terminal connection assembly of claim 2, wherein the cylindrical metal post includes at least one annular groove that is formed on the exterior surface of the post and is designed to receive the annular contact.

5. The terminal connection assembly of claim 1, wherein the cylinder is a hollow metal cylinder that is open at both the lower end and the upper end.

6. The terminal connection assembly of claim 5, wherein the hollow metal cylinder includes at least one annular groove that is formed on the interior surface of the cylinder lower end and is designed to receive the annular contact.

7. The terminal connection assembly of claim 6, wherein the hollow metal cylinder includes a first annular groove that is formed on the interior surface of the cylinder lower end and receives a first annular contact and a second annular groove that is also formed on the interior surface of the cylinder lower end and receives a second annular contact, and wherein the first and second annular grooves are axially spaced from one another on the interior surface so that each of the first and second annular contacts circumferentially surrounds the post.

8. The terminal connection assembly of claim 5, wherein the hollow metal cylinder includes threads that are formed on the interior surface of the cylinder upper end and are designed to interact with threads on a retention feature.

9. The terminal connection assembly of claim 1, wherein the cylinder includes a non-rotational feature that is formed on the exterior surface of the cylinder and prevents the cylinder from rotating within a molded part when an operator is connecting or disconnecting the terminal connection assembly.

10. The terminal connection assembly of claim 9, wherein the non-rotational feature is a hex-type feature formed on the exterior surface of the cylinder upper end.

11. The terminal connection assembly of claim 1, wherein the at least one annular contact is a resilient annular contact that circumferentially surrounds and contacts the post.

12. The terminal connection assembly of claim 11, wherein the resilient annular contact includes a circular spring-like annular contact having a plurality of individual contact points.

13. The terminal connection assembly of claim 11, wherein the resilient annular contact includes a cylindrical sleeve-like annular contact having a plurality of individual contact points.

14. The terminal connection assembly of claim 1, further comprising a retention feature, wherein the retention feature is a metal bolt that is secured to threads on the interior surface of the cylinder so that the one or more bus bar(s) are compressed between the bolt and the cylinder upper end.

15. A power distribution device comprising a lower cover, a master fuse cover, a junction block assembly, an upper cover, and the terminal connection assembly of claim 1.

16. A terminal connection assembly for use in a power distribution device that is part of a vehicle electrical system, comprising:
    a cylinder being made from an electrically conductive metal and having a lower end, an upper end, an interior surface, and an exterior surface, the cylinder upper end includes threads on the interior surface and a non-rotational feature on the exterior surface;
    at least one annular contact being made from an electrically conductive metal and being retained within the cylinder lower end, the annular contact is designed to make an electrical connection between a component that provides battery power and the cylinder; and
    a bolt having threads that interact with the threads on the cylinder interior surface and securing the terminal connection assembly within the power distribution device, wherein the terminal connection assembly provides battery power to one or more bus bar(s) in the power distribution device.

\* \* \* \* \*